E. L. MATTHEWS.
ADDING AND LISTING MACHINE.
APPLICATION FILED APR. 27, 1908.

1,028,896.

Patented June 11, 1912.
9 SHEETS—SHEET 2.

WITNESSES

INVENTOR
EDWIN L. MATTHEWS
BY Paul & Paul
HIS ATTORNEYS

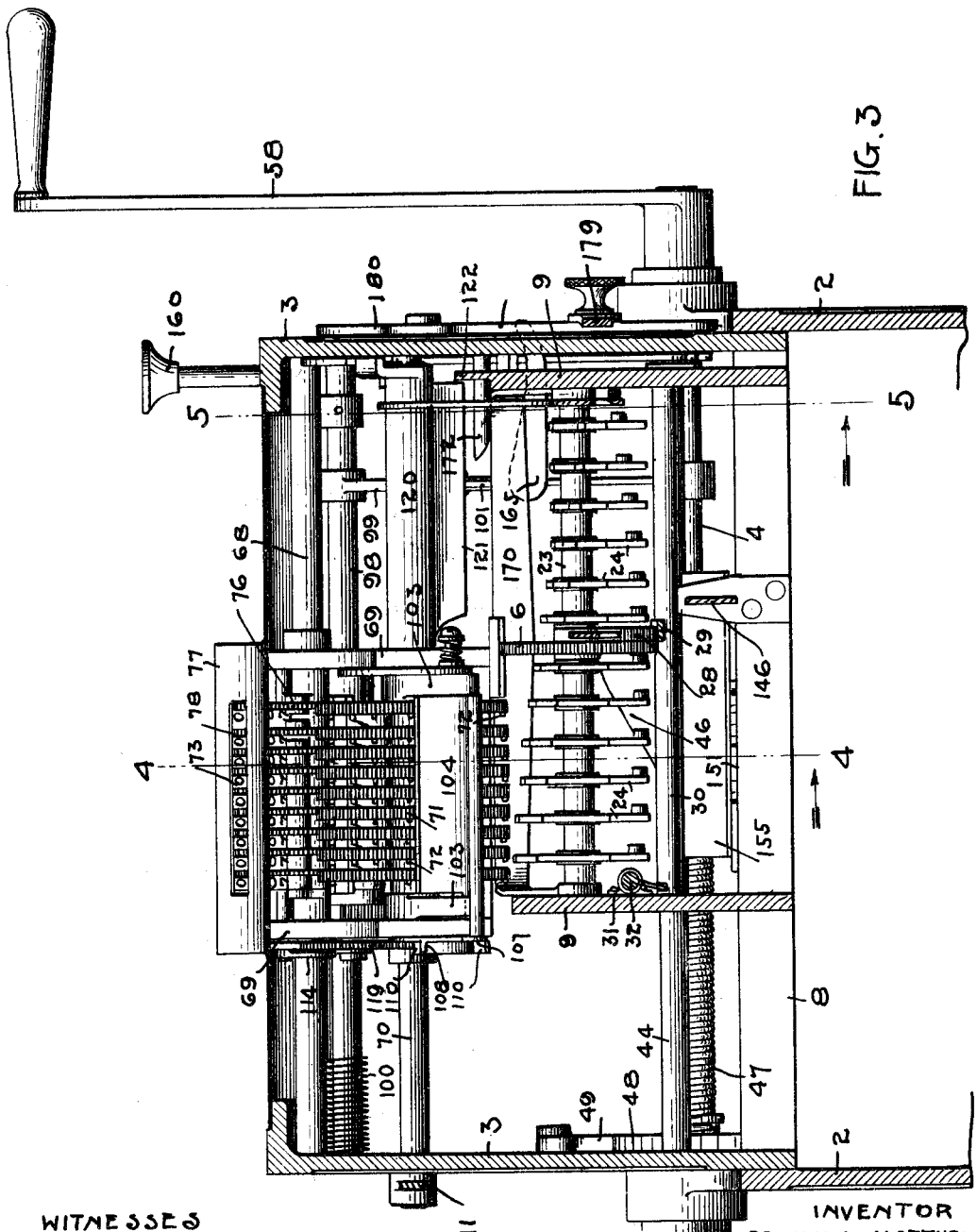

E. L. MATTHEWS.
ADDING AND LISTING MACHINE.
APPLICATION FILED APR. 27, 1908.
1,028,896.
Patented June 11, 1912.
9 SHEETS—SHEET 4.
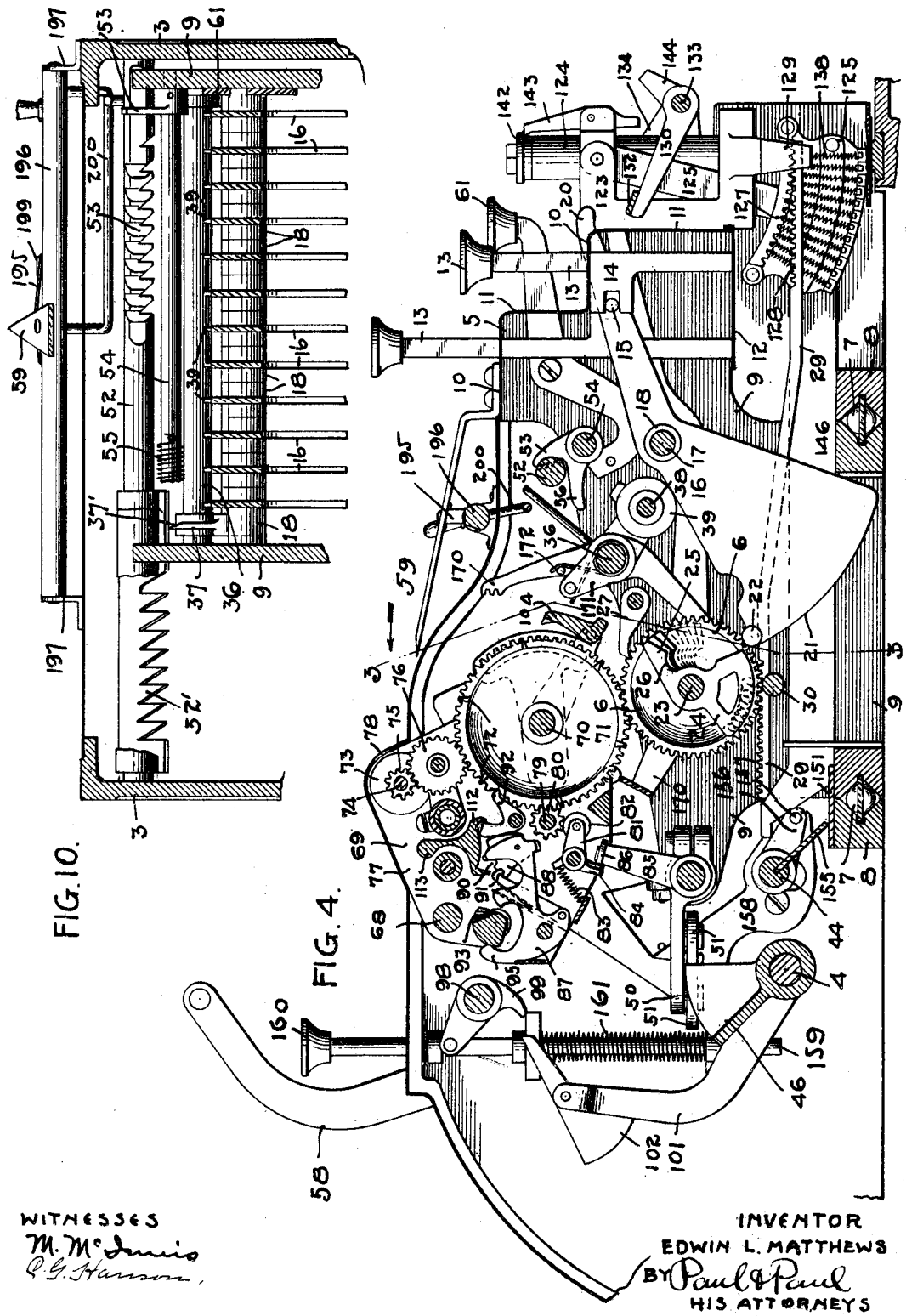
WITNESSES
M. McInnis
C. G. Hanson
INVENTOR
EDWIN L. MATTHEWS
BY Paul & Paul
HIS ATTORNEYS E. L. MATTHEWS.
ADDING AND LISTING MACHINE.
APPLICATION FILED APR. 27, 1908.
1,028,896.
Patented June 11, 1912.
9 SHEETS—SHEET 5.
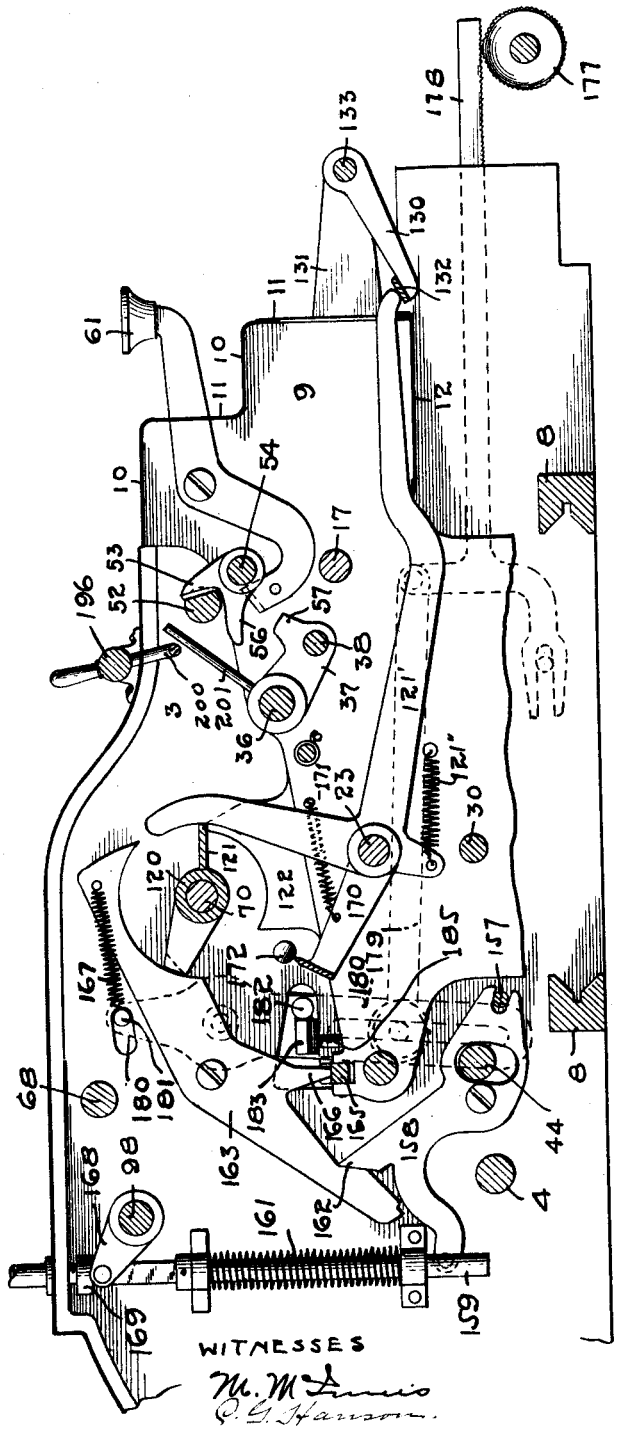
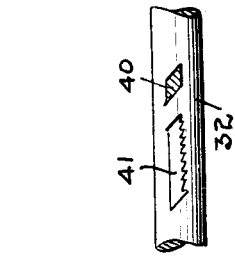
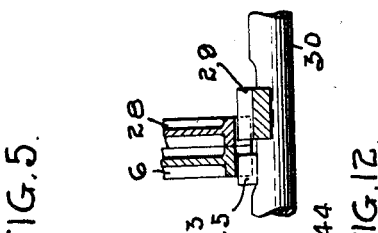
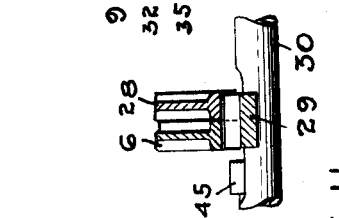
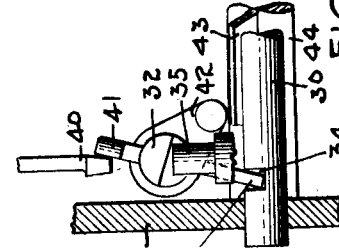
INVENTOR
EDWIN L. MATTHEWS
BY
HIS ATTORNEYS

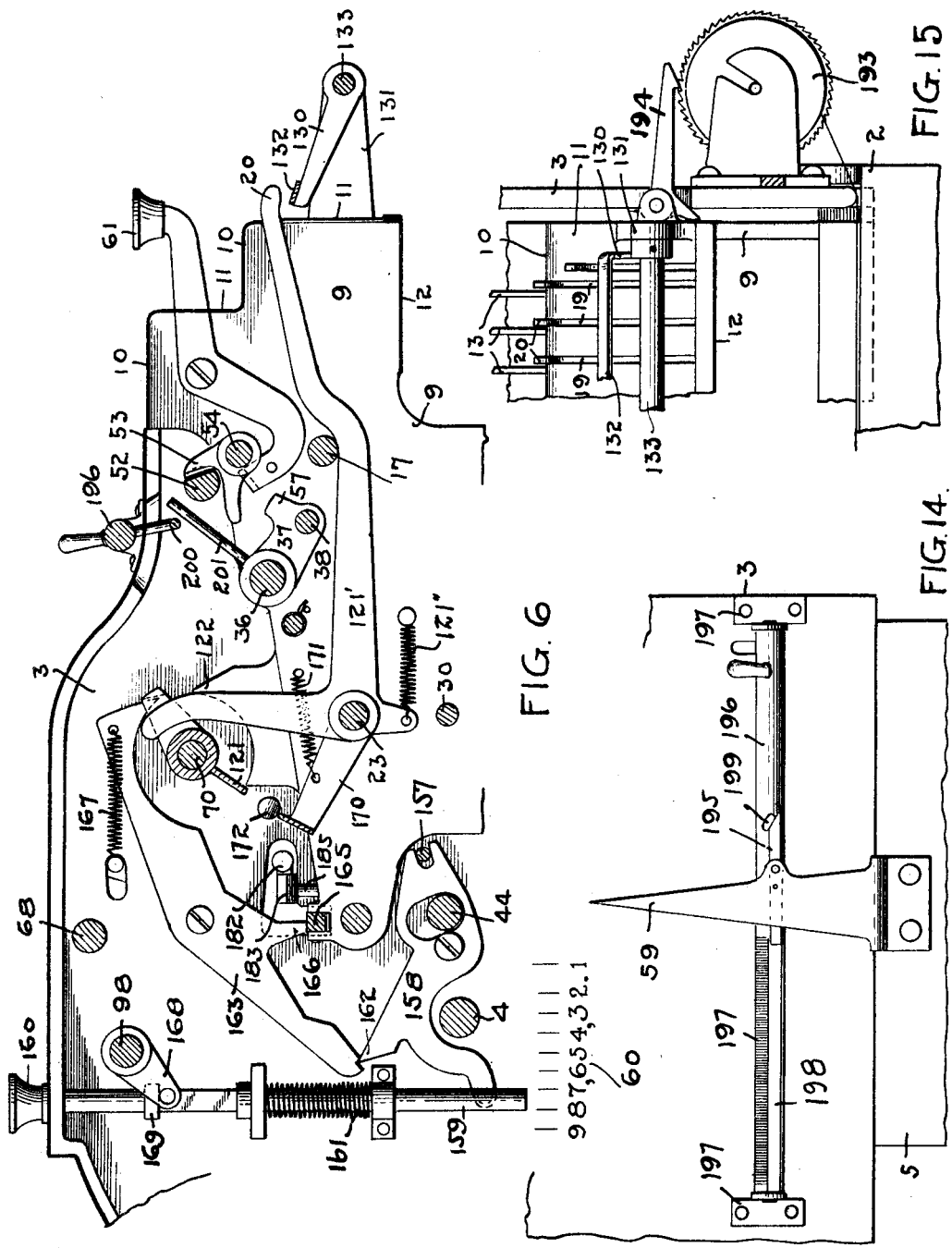

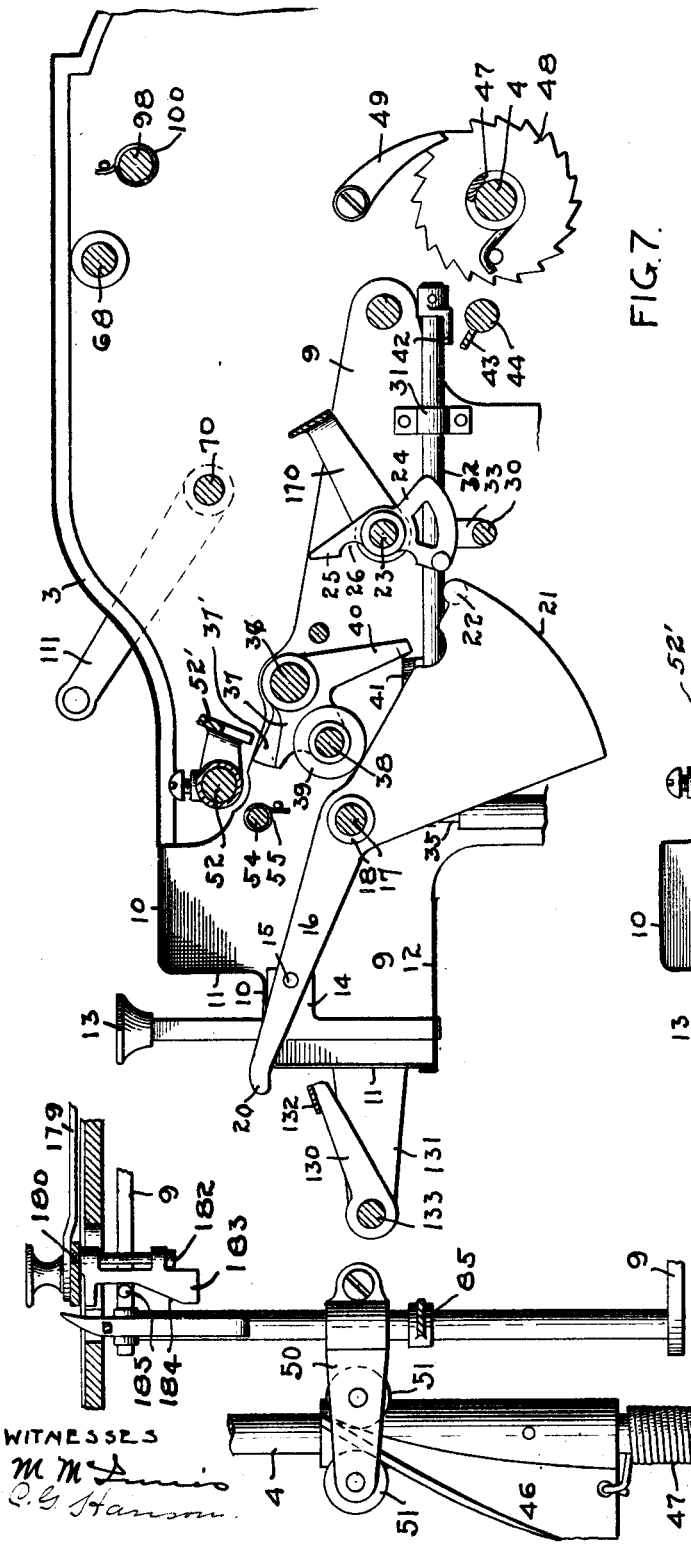
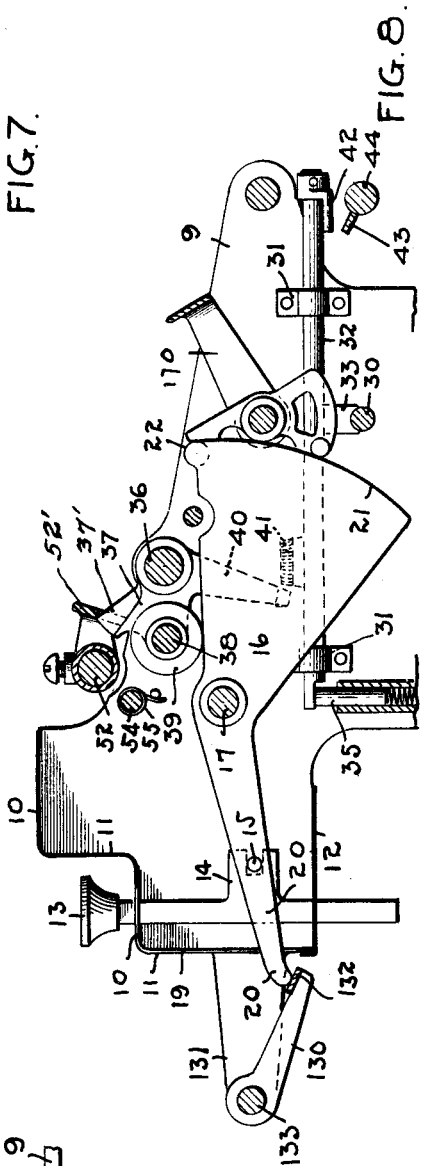

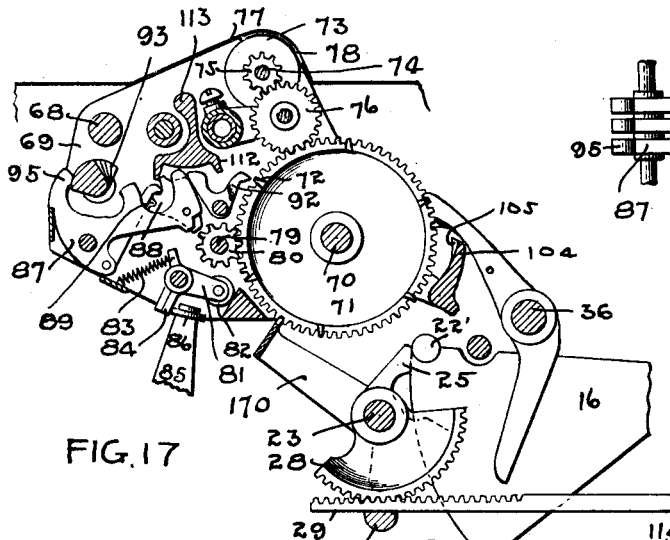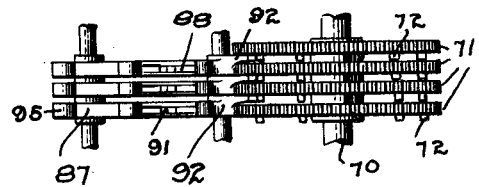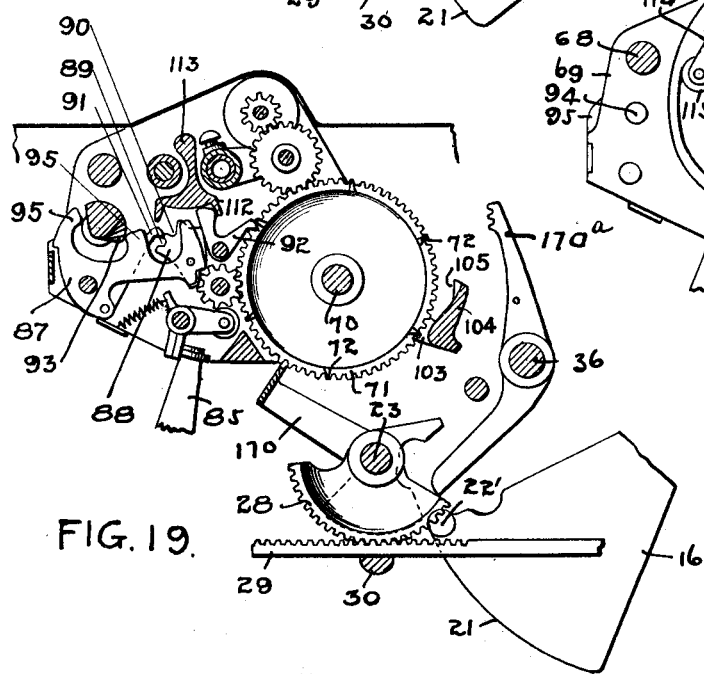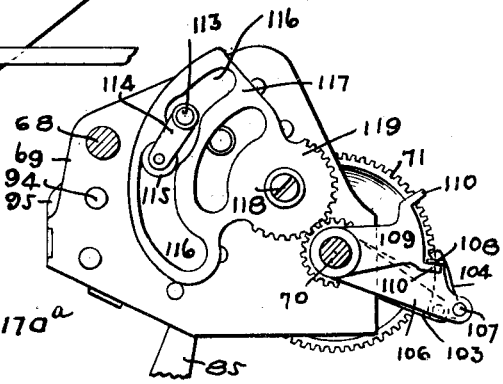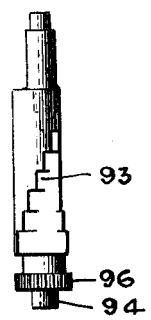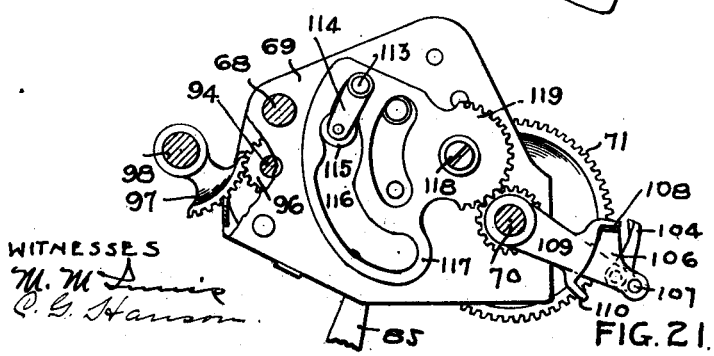

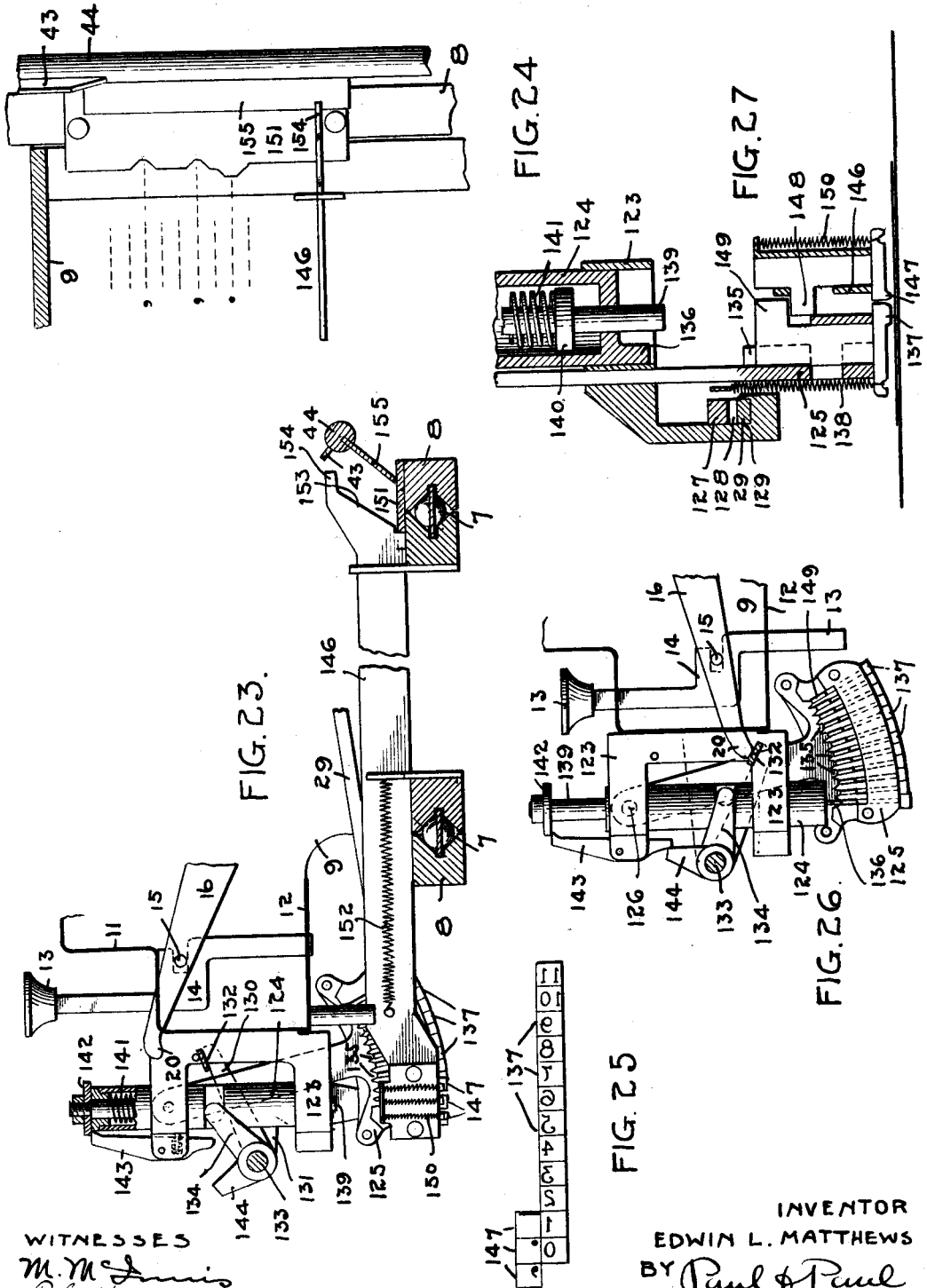

UNITED STATES PATENT OFFICE.

EDWIN L. MATTHEWS, OF MINNEAPOLIS, MINNESOTA.

ADDING AND LISTING MACHINE.

1,028,896.  Specification of Letters Patent.  Patented June 11, 1912.

Application filed April 27, 1908. Serial No. 429,377.

*To all whom it may concern:*

Be it known that I, EDWIN L. MATTHEWS, a resident of Minneapolis, county of Hennepin, State of Minnesota, have invented certain new and useful Improvements in Adding and Listing Machines, of which the following is a specification.

The invention relates to improvements in that type of adding machines that are commonly employed for printing lists of checks, or other items, adding the total of such checks or items, and printing such total at the foot of the column of items.

The objects I have in view are to provide a machine of this character that is simple in construction, easily and rapidly operated, and which can be quickly adapted for adding numbers under the decimal system, or for adding other systems of numbers, such as the pounds, shillings and pence of English money, or the bushels and pounds of any kind of grain, produce or other material.

Another object of the invention is to provide a machine that will print its figures or characters very plainly, both upon an original sheet and upon any desired number of manifold or carbon printed sheets.

Other objects of the invention will appear from the following detailed description taken in connection with the accompanying drawings, in which—

Figure 1:
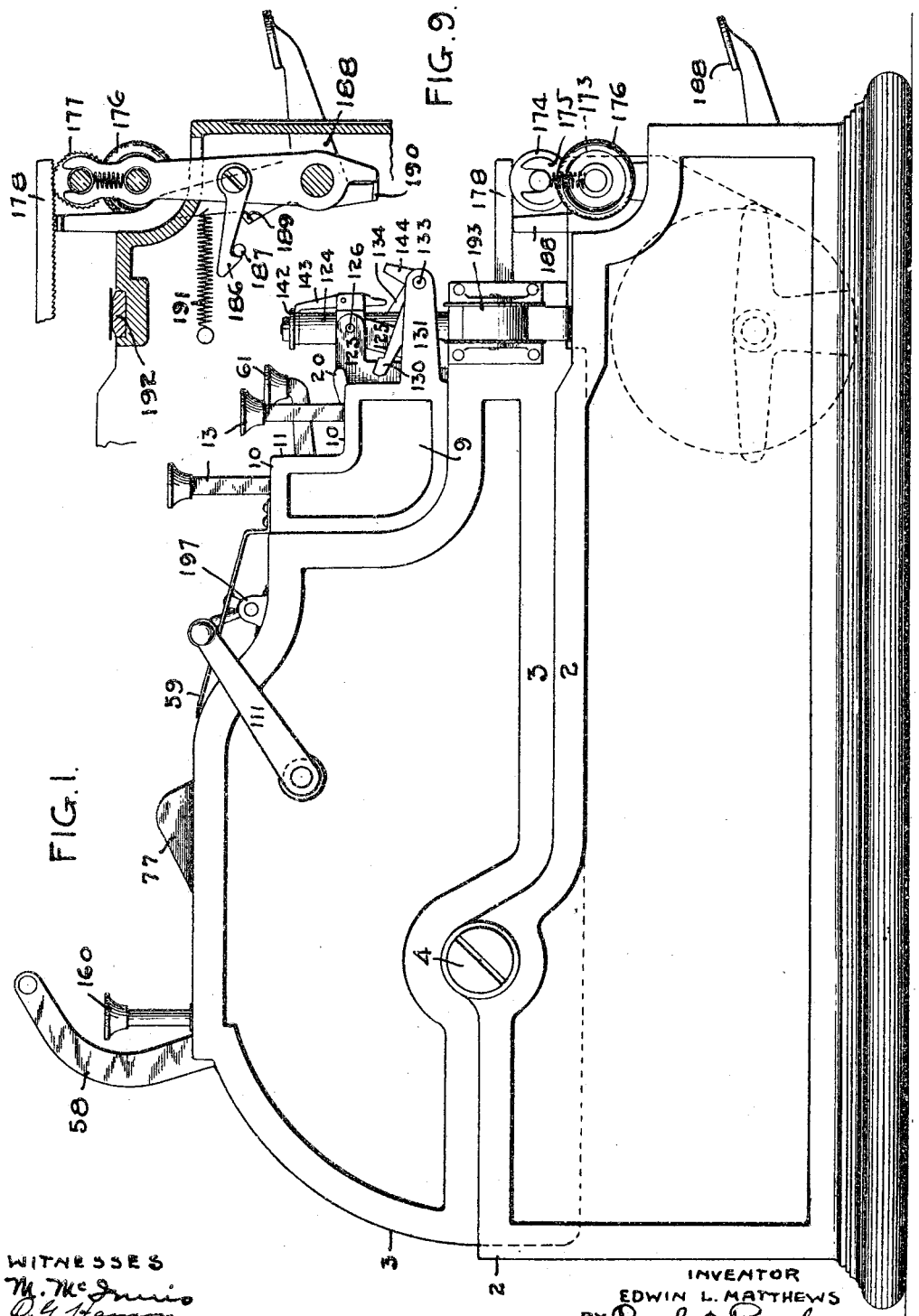
Figure 2:
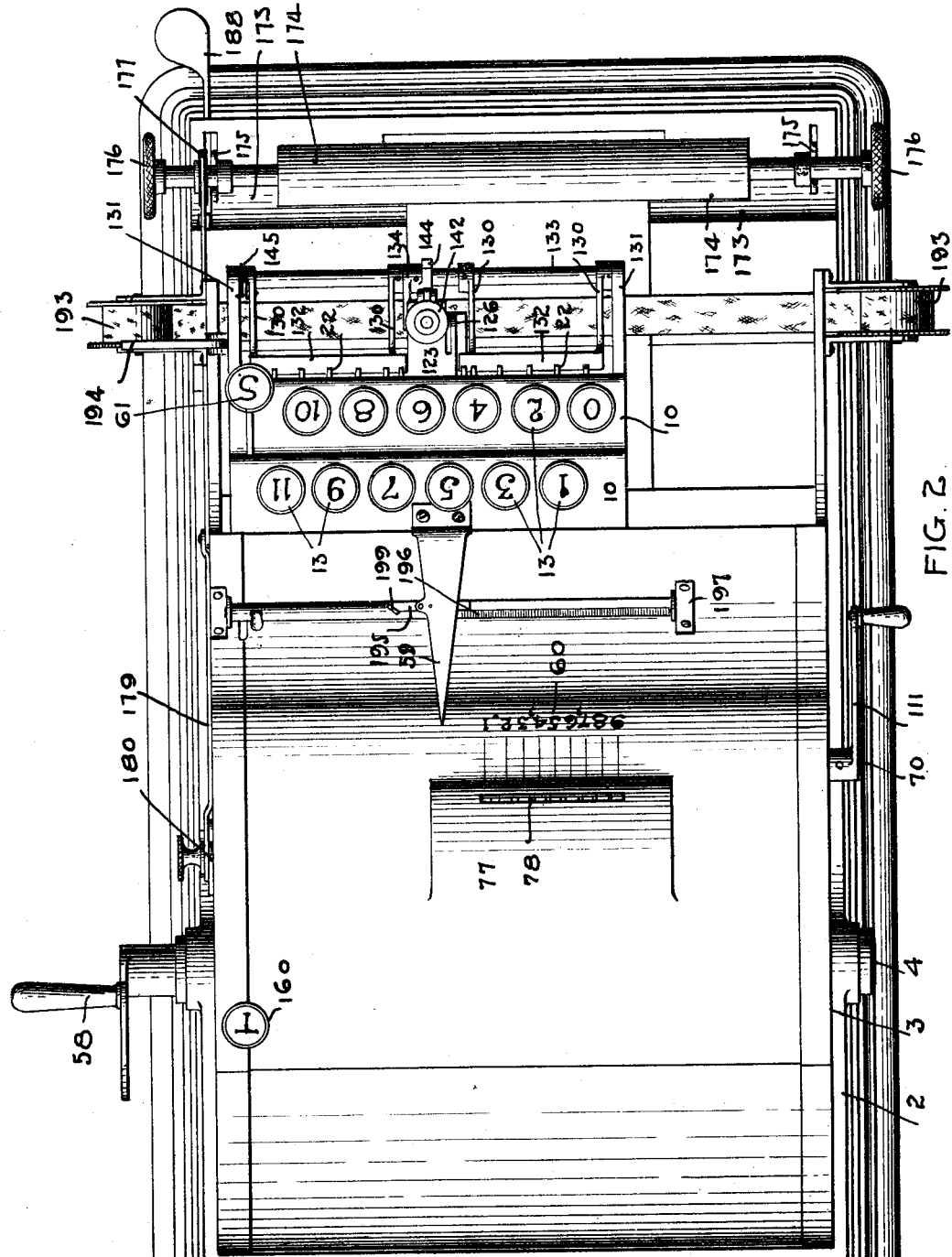

Figure 1 is a side elevation of an adding and listing machine embodying my invention. Fig. 2 is a plan view of the same. Fig. 3 is a vertical transverse section on line 3—3 of Fig. 4. Fig. 4 is a vertical longitudinal section on the line 4—4 of Fig. 3. Fig. 5 is a partial longitudinal section on line 5—5 of Fig. 3. Fig. 6 is a view similar to Fig. 5 with the lower part of the frame and paper feeding device omitted and with the parts in a different position from that shown in Fig. 5. Fig. 7 is a detail section of the key lever and other parts coöperating therewith. Fig. 8 is a similar view showing the parts illustrated in Fig. 7, but in a different position. Fig. 9 (Sheet 1) is a detail of the paper feed. Fig. 10 (Sheet 4) is a detail section of a portion of the carriage and the escapement feed therefor. Figs. 11, 12 and 13 are details of the mechanism for shifting the position of the rack-bar. Fig. 14 is a detail of a portion of the carriage showing the pointer that indicates the wheel that is next to be operated. Fig. 15 is a detail of a portion of the carriage showing also the ribbon feed. Fig. 16 is a detail of the carriage feed. Figs. 17, 18, 19, 20, 21 and 22 are details of the adding wheels and the parts immediately coöperating therewith. Figs. 23, 24, 25, 26 and 27 are details of the printing mechanism.

The principal parts of the mechanism of this machine are inclosed in a casing consisting preferably of a lower part or base 2, and an upper part 3. The part 3 is preferably narrower and fits within the base or lower part 2 and the principal parts of the mechanism are inclosed within the upper part 3. This upper part 3, and the mechanism inclosed thereby, is pivoted upon the base by the shaft 4 which is mounted in bearings in said base and extends through the sides of the upper part of the casing 3.

Arranged within the casing, preferably in a substantially central position transversely of the machine, are a series of adding and indicator wheels (hereinafter described), and also arranged within the casing is a transversely movable carriage 5, carrying a series of keys and key levers, and a motor wheel 6 that is adapted to engage each of the adding wheels, in succession, as said carriage is moved, step by step, from left to right across the casing, and to turn the adding wheel with which it is in engagement a number of teeth corresponding to the numeral of the operating key. As each key is operated, the corresponding indicating wheel is turned to show the number of the key that is thus operated, and carrying devices in connection with said wheels are put in position, to be operated by the reverse movement of the carriage, so as to carry from one wheel to the next through the series, whereby when each wheel has been turned a number of teeth equaling the number of units that it takes of the denomination represented by said wheel to make one of the next higher, the next higher wheel will also be turned one step or tooth. I also provide means operated by said keys to print upon a suitable sheet or strip of paper, or other material, a number corresponding to the number on each wheel that is moved into indicating position. It will thus be seen that there are three principal groups of mechanisms that go to make up the principal parts of this mechanism. These, for convenience, I have designated as "the motor-wheel operating mechanism," "the adding and indicating wheels and carrying mechanism" and "the printing mechanism". I will describe these principal groups of mechanisms, and will also describe certain minor mechanisms which coöperate with said principal mechanisms.

*The motor-wheel operating mechanism.*— The transversely movable carriage 5 is supported preferably by ball bearings 7 in the transverse rails 8, which are supported in the lower part of the casing 3 (see Fig. 4). The outline of the carriage 5, which is provided with the side-plates 9—9, is indicated by the parallel shading lines in Fig. 4 of the drawings. The plates 9 are connected by the sheet metal top, front and bottom plates 10, 11 and 12 (see Fig. 4). This carriage supports the motor wheel 6 and its operating mechanism, including the series of keys 13, which, in the form of machine shown in the drawings, are twelve in number, and are numbered consecutively from naught to eleven. Each of the keys 13 is mounted to slide vertically in slots in one of the upper plates 10 and in the lower plate 12, and each of said keys is provided with lugs 14 between which a pin 15, on a pivoted key lever 16, extends. The levers 16 are all mounted so as to turn freely and independently, upon a transverse shaft 17 which is supported at its ends in suitable bearings in the plates 9 of the transversely movable carriage 5. Said key-levers 16 are preferably mounted loosely upon the shaft 17, and are separated and spaced apart by the sleeves 18. The rear ends of said levers are provided with a curved edge 21, forming an arc of a circle, the center of which is coincident with the shaft 17. Said lever is also provided at its upper edge, and on one face thereof, with a laterally projecting stud 22. The forward end 20 of each of the key levers 16 projects through a slot 19 formed in the front and top plates 11 and 10 of the transversely movable carriage 5. As each key is depressed the forward end of the corresponding key-lever 16 moves downward through the corresponding slot 19, while the rear end of the lever moves upward in the arc of a circle, whose center is coincident with the center of the shaft 17.

Mounted in bearings in the side plates of the transversely movable carriage 5 is a shaft 23 that is parallel with the shaft 17. The shaft 23 is capable of a partial rotation upon its axis forward and back. Secured upon this shaft, so as to rotate therewith, are a series of hubs 24, each of said hubs being preferably of approximately triangular form, and each being provided with a radially projecting point 25, and with a recess 26. These hubs are secured to the shaft 23 and said points 25 are arranged in succession, one after the other, the difference in position between each point and the next succeeding one corresponding to one tooth upon the motor wheel 6, as hereinafter described. These hubs are arranged in substantially the same planes with the key levers 16, so that as any one of the keys is depressed the rear end of the corresponding key-lever is raised, and the stud 22, upon said lever, engages the recess 26 in the corresponding hub 24, thereby turning said hub and with it the shaft 23. The amount of movement that will be imparted to the hub is determined by the position of the point 25, and the positions of these points are fixed by the movement any one of said keys is designed to impart to the hub 24 and the shaft 23. For instance when the No. 1 key is operated the hub will be moved a distance corresponding to one tooth on the motor-wheel hereinafter described. When the No. 11 key is operated the corresponding hub will be moved a distance equal to eleven teeth on the motor wheel. It will be noted that, after the hub has been turned the desired amount, a further movement of the key and key-lever will not, owing to the shape of the rear end of the key lever, produce any further movement in the hub, and, when the key is being returned to its normal position, the stud 22 on the key lever will engage the lower part of the hub and will restore the hub to its normal or first position (see Figs. 7 and 8). After the hub has been turned the desired amount the key-levers have a further free movement owing to the fact that all the keys and key-levers move the same distance while the movement of the parts operated by said levers is proportioned to the number designated by the key that is being operated. For instance, while the 1-key and key-lever have the same movement as the 11-key, and 11 key-lever, the motor wheel is moved only one tooth when the 1-key is operated and is moved eleven teeth when the 11-key is operated, and other parts correspondingly. The movement of the key-levers is therefore always the same, and this is necessary in order to effect a proper movement of the other parts that are operated by said key-levers, as hereinafter pointed out.

Mounted upon the shaft 23, so as to turn freely thereon, is the motor-wheel 6. This wheel is adapted to turn freely upon said shaft and it moves with the shaft and carriage transversely of the machine. In Fig. 3 of the drawings the carriage and motor-wheel are shown in their extreme position to the right. As soon as any listing operation is completed the carriage is returned to its left hand position and the machine is then in readiness for setting up the next number upon the indicating wheels, adding it to the number already shown thereon, and simultaneously, printing said number upon the recording sheet or slip, as hereinafter described. As the motor-wheel is designed to turn in only one direction, a pivoted dog 27 is provided which engages said wheel and prevents any reverse movement thereof (see Fig. 4). Secured upon the shaft 23 by the side of the motor wheel 6 is a gear-wheel segment 28, of the same radius as the motor-wheel, and having teeth upon its periphery of the same size and pitch as the teeth of the motor-wheel.

A rack-bar 29 is arranged with its teeth in engagement with the teeth of the segment 28 (see Fig. 19). This rack bar extends to the forward end of the machine and controls the printing device, as hereinafter described. The face of the rack-bar 29 is of sufficient width to simultaneously engage both the wheel-segment 28 and the motor-wheel 6. When said rack bar stands in its normal position, as shown in Fig. 3, it is in engagement only with the segment 28. When the rack bar is shifted sidewise it will also engage the teeth of the motor-wheel 6, and a movement of said segment will cause said rack-bar and said motor-wheel to move with it. As the movement of the motor-wheel cannot be reversed, as soon as the segment and said motor-wheel have moved the required distance together, the rack-bar is again shifted so as to disengage its teeth from the teeth of the motor-wheel, and the segment and the rack-bar are given a reverse movement and returned to their original positions, while the motor-wheel remains in the position to which it has been moved by said segment and rack-bar.

For the purpose of causing the rack-bar to engage with the motor-wheel during the downward movement of the keys, and the upward movement of the rear end of the key-levers, and to be disengaged from said motor-wheel at the end of the upward, or forward, movement of said key-levers, I provide, beneath said rack-bar, a transverse rod or bar 30, which is provided with a recess in its upper surface into which said rack-bar fits, and in which the rack-bar is adapted to slide longitudinally. The bar 30 is mounted at its ends in the side plates 9 of the carriage 5, and so as to be capable of a slight longitudinal motion, sufficient to permit said rack-bar to be shifted into and out of engagement with the motor-wheel 6 (see Figs. 11 and 12). Mounted in bearings 31, preferably arranged upon one of the side-plates 9 of the carriage 5, is a rock-shaft 32, having an arm 33 that engages the slot or recess 34 in the bar 30. The rock-shaft 32 has a flat portion at one end which rests upon a spring controlled plunger 35. This plunger normally holds the rock-shaft 32 in position with the arm 33 standing vertically, and the rack-bar 29 out of engagement with the motor-wheel 6. A rock-shaft 36 is mounted in the side plates 9 of the carriage 5, and said rock-shaft is provided near its ends with the crank-arms 37 in which is mounted a shaft 38 carrying a series of wheels 39. These wheels 39 stand directly over the key-levers 16, so that as any one of the keys is depressed and the rear end of the corresponding key-lever is moved upward, the corresponding wheel 39 is engaged by the key-lever and the shaft 36 is thereby rocked upon its axis, moving it from the position shown in Fig. 7 to the position shown in Fig. 8. This shaft 36 carries a crank-arm 40 which extends downward into position with its lower end standing a short distance above the rock-shaft 32. The rock-shaft 32 is provided with an upwardly-extending lug 41, and the lower end of the crank-arm 40, being suitably beveled, is caused to engage said lug 41, and to move it from a vertical position into the inclined position shown at the left in Fig. 11, thereby moving the bar 30 longitudinally in its bearings, and bringing the rack-bar 29 into engagement with the motor-wheel 6, as shown in Fig. 11 of the drawings. As soon, however, as the end of the crank arm 40 has passed the lug 41, the spring-plunger 35 will throw the shaft 32 back into its normal position with the lug 41 standing vertically. Upon a reverse movement of the crank-arm 40 it will engage the other side of the lug 41, and will turn said lug into the position shown in Fig. 12. The lug 41 is provided on one side with a series of teeth (see Fig. 13). The object of these teeth is to prevent a key from being operated a second time before it has completed its full backward movement and has been returned to its normal position. The crank-arm 40 can pass the lug 41 in one direction only on the side that is provided with teeth. For the purpose of locking the rack-bar out of engagement with the motor-wheel, which is done when a total is to be printed, I provide upon the rock-shaft 32 a crank-arm 42 which may be engaged by a wing 43 upon a rock-shaft 44 that is operated by the total key, hereinafter described. So long as this wing remains in engagement with the crank-arm 42, said crank-arm, the rock-shaft 32, and the lug 41 are locked in the position shown in Fig. 12 of the drawings, and the movement of the crank 40 does not cause any movement of the sliding bar 30 and rack-bar 29. I prefer to provide a lug or tooth 45 on the top of the sliding bar 30 (see Figs. 11 and 12), in such position that said lug engages the motor-wheel, when the rack-bar is not in engagement with said motor-wheel, and locks said motor-wheel, and prevents it from turning upon its axis.

There are certain features of the mechanism that are employed for moving the carriage laterally that it is advisable to describe before describing the other principal groups of the machine.

*Carriage-moving means.*—The means for causing the carriage to move laterally each time that a key is operated is, in some respects, similar to that employed for the carriage of an ordinary typewriter. As here shown, the shaft 4 has secured to it a spiral wing 46, and a spring 47 surrounds said shaft, having one end engaging said wing and the opposite end engaging a pin on the ratchet wheel 48, that is mounted on said shaft just inside the casing of the machine. A dog 49 engages said ratchet and prevents any backward movement thereof. An arm 50 on the carriage 5 is provided with two rollers 51—51 and the spiral wing 46 extends between these rollers. The spring 47 tends to rotate the shaft 4, and the engagement of the wing 46 with the rollers 51 tends to move the carriage laterally, said lateral movement being controlled by an escapement device that is operated to permit the carriage to be moved one step upon the downward movement of any key. I may employ any suitable escapement device for controlling the lateral movement of the carriage. I have here shown a ratchet-bar 52 that is mounted in the walls of the casing 3 and extends above said carriage. A dog 53 is secured upon a rock-shaft 54, which is surrounded by a spiral spring 55 that tends to hold said dog in engagement with any one of the ratchet-teeth in the bar 52. An arm 56 is also secured to the rock-shaft 54, and said arm is in position to be engaged by a projection 57 on the rock-shaft 36 each time one of the key-levers has its rear end elevated by the depressing of the operating key. The upward movement of the projection 57 causes the dog 53 to be moved out of the notch in the ratchet bar with which it is at the time in engagement, and the spring 47, acting upon the carriage through the spiral wing 46, will move the carriage one step permitting the ratchet dog to enter the next notch in the ratchet-bar 52. A second ratchet-bar 52′ having inclined teeth is arranged upon and parallel to the bar 52 (see Figs. 7 and 8) and a tooth 37′ on the crank-arm 37 is adapted to engage these teeth, one after another, as the crank-arm 37 is raised by the operation of the key-lever. The two ratchet-bars 52 and 52′, with the dog 53 and the tooth 37′, form an escapement which allows the carriage to move across the machine from left to right, step by step, as the keys are operated. When the carriage has been moved to the limit of its movement toward the right and it is desired to move it toward the left to begin the recording and adding of another item, the crank 58 on the shaft 4 is grasped and drawn forward by the operator, thereby, through the spiral wing 46, moving the carriage the desired distance toward the left and putting the spring 47 under tension.

The laterally movable carriage is provided with a pointer 59 (see Fig. 2) and the casing is provided with a number scale 60 (see Fig. 2) which shows the position to which the carriage should be moved in order to record and add any desired number. For instance if the number to be added is 4121 lbs., 19 shillings and 9 pence, the operator will move the carriage into such position that the pointer 59 will be opposite the figure 7 on the scale 60. Should the operator move the carriage too far toward the left he can readily move it the desired number of spaces toward the right by means of the space-key 61 (see Figs. 2, 4 and 5). This key is in the form of a pivoted lever with its inner end in position to engage the dog 53 and, when the outer end of the key is depressed, to raise said dog out of the notch in the ratchet-bar 52, with which it is then in engagement, thereby permitting the carriage to be moved one step toward the right.

*The adding and indicating wheels.*—Mounted upon the fixed shaft 70 in the upper part 3 of the casing, and capable of turning freely thereon, are the series of primary adding wheels 71. These wheels are adapted to rotate freely on the shaft 70 and each wheel is arranged to have the motor-wheel 6 brought into mesh therewith as said motor-wheel is moved laterally with the carriage, across the machine. As the motor-wheel 6 is rotated, in the manner already described, the primary adding wheel, with which it is in mesh, is given a partial rotation, the extent of movement of said wheel corresponding to the number of the key that is operated. In connection with each of said primary adding wheels I provide a series of carrying teeth 72 (commonly called "bull-teeth"), and said carrying teeth are arranged at intervals, and divide the teeth, on said adding wheels, into groups corresponding to the number of units to be added by any wheel before the next wheel is moved one tooth, or before the machine "carries" from one wheel to the next. As shown in Fig. 4 the carrying wheel there represented is provided with sixty teeth, divided, by the bull-teeth 72, into six groups of ten teeth each. This is the preferred arrangement where the numbers to be added come under the decimal system. In adding numbers representing, for instance, English money, the wheels for the shillings and pence will have appropriate groupings for the carrying-teeth. For instance in the machine shown in the drawings the pence-wheel is divided into groups of twelve teeth each, while the second or tens-of-shillings-wheel is divided into groups of two teeth. With this arrangement, the pence wheel, five times in each revolution, carries one to the next or units-of-shillings wheel, while the tens-of-shillings wheel carries one to the next, or units-of-pounds, wheel at every second step in its revolution.

The indicating wheels 73 are mounted upon a shaft 74 so as to turn freely thereon. Each of said wheels is provided upon its periphery with numerals corresponding to the number of units required to make one unit of the next higher denomination. For instance, in the machine shown, the right-hand, or pence wheel, has numerals running from 0 to 11. The third wheel from the right, which represents the tens of shillings has the numerals 1, 2 in repetition, around the entire periphery of the wheel. Each of said wheels 73 has a pinion 75 secured to it, and an intermediate pinion 76 meshes with the primary adding wheel 71 and the corresponding pinion 75. A suitable casing 77 incloses the indicating wheels, and this casing is provided with an opening 78 through which the numbers on the faces of the wheels may be read. The casing 77 is supported by the shaft 70, which has its bearings in the walls of the main casing, and by a rod 68, also having its ends mounted and supported in the walls of the main casing. The casing 77 is provided with two side plates 69, 69, and the shafts for the parts of the carrying mechanism are mounted in said plates.

*The carrying mechanism.*—I provide means for carrying from each wheel to the next succeeding wheel, representing numbers of a higher denomination, and the carrying device is arranged to be set, or put in carrying position, when the corresponding primary adding wheel is turned a sufficient number of steps to complete a revolution of its connected indicating wheel, or to bring said wheel into position to indicate or show a nought (0) at the indicating opening 78 in the casing 77. Mounted in the casing, parallel with the shaft 70, is a shaft 79 provided with a series of pinions 80, which are in mesh with the primary adding wheels 71. These pinions and the said primary adding wheels must rotate together. A locking dog 81 is pivoted in the rear of each pinion and is provided with a small roller 82, that engages the teeth of the pinion, being held in contact therewith by a spring 83. Each of said dogs is provided with an arm 84. An arm 85, mounted upon and moving with the carriage 5, has a wheel 86, adapted to engage each of the arms 84, in each movement of the carriage, and thereby move the roller on the arm of the locking dog out of engagement with the corresponding pinion 80, or, in other words, the locking dog is moved from the position shown in Figs. 4 and 19 to the position shown in Fig. 17. As the arm 85 is in the same vertical plane with the motor wheel 6, it follows that the locking dog 81 is out of engagement with the pinion 80 at the time when the motor-wheel is in mesh with the corresponding primary adding wheel 71. Each pinion 80 is released by its locking dog 81, and is rotated a sufficient amount to cause the connected primary adding wheel 71 to move one step each time that its carrying mechanism is operated by one of the bull-teeth of the preceding primary wheel. During the forward, or left-to-right movement, of the carriage, when the keys are being operated to actuate the primary adding wheels and the connected indicating wheels, each carrying device is set by the passage of a bull-tooth on the corresponding primary wheel. Then as the carriage is reversed, or moved from right to left, the carrying devices are actuated successively, and each carrying device that has been set by the passage of a bull-tooth on the corresponding primary adding wheel, is now actuated to turn the pinion 80 that is in engagement with the next succeeding primary adding wheel, and thereby to turn such wheel and the indicating wheel connected therewith one step.

For actuating the pinion 80 in the manner set forth, I provide a pivoted actuator lever 87, one for each primary adding wheel, each lever being provided with a pivoted actuator head 88. One end of the actuator head is provided with locking notches 89 and 90, and a spring actuated dog 91, pivoted on the lever 87, is arranged to engage one or the other of said notches 89 or 90 in said actuator head 88. When the actuator head is in the position shown in Fig. 4 of the drawings the lever 87 may be rocked on its pivot without imparting any motion to the pinion 80. When, however, the actuator head 88 is moved into the position shown in Fig. 17 of the drawings, a rocking movement of the lever 87 causes the point of the actuator head 88 to engage the pinion 80 and turn said pinion upon its axis a sufficient distance to turn the primary adding wheel 71 and the connected indicator wheel one step. Arranged contiguous to each actuator head 88 and in engagement therewith is a double-arm operating-dog 92. This dog is mounted upon a suitable pivot and one arm thereof is in engagement with the side of the actuator head 88, while the point of the other arm of the dog projects between the primary adding wheels 71, in position to be engaged by the bull-teeth on the corresponding primary adding wheel 71. Normally the parts stand in the position shown in Fig. 4 of the drawings with the end of the dog 92 in position to be engaged by the bull-teeth of the corresponding primary adding wheels. When one of the bull-teeth engages the end of the corresponding dog 92, said dog is turned from the position shown in Fig. 4 to the position shown in Fig. 17 and the actuator head 88, with which it is in engagement, moves from the position shown in Fig. 4 to the position shown in Fig. 17. The actuator heads, that have been moved during the operation of the keys, and the corresponding movements of the primary adding wheel 71, will now all remain in the position shown in Fig. 17, until the carriage is moved from right to left. During this movement of the carriage the actuator levers 87 are successively moved for the purpose of operating those actuator heads that have been set in operating position. For the purpose of moving the actuator levers, a cam shaft 94 is mounted in bearings in the plates 69, 69, and arranged above the actuator levers 87. This shaft has a series of cams 93 arranged in steps, one after the other, and said cams are located in the space between the arms 95 on the levers 87. Said cam shaft is provided with a pinion 96 which is engaged by a sector 97 on a rock-shaft 98. This shaft 98 is provided with a lug 99 (see Fig. 4) and a coiled spring 100 (see Fig. 3) surrounds the shaft 98 and serves to return it to its normal position after it has been rocked on its axis for the purpose of operating the cam-shaft 94 through the sector 97.

For engaging the lug 99 and thereby rocking the shaft 98, I provide on the shaft 4 an arm 101 (see Fig. 4) having a pivoted and weighted head 102. As the shaft 4 is rocked by the crank 58, for the purpose of moving the carriage toward the left, the point of the head 102 on the arm 101 engages the lug 99 and rocks the shaft 98 against the tension of the spring 100. After having rocked said shaft 98 the desired distance, and thereby caused the sector 97 to move the cam-shaft 94, the head 102 slips off from the lug 99 and the spring 100 returns the shaft 98 and the cam-shaft 94, to their original positions. The pivoted form of the head 102 permits it to pass under the lug 99 on the return movement of the shaft 4. By this means as the carriage is moved from right to left, after each number has been set up by the keys, the actuator levers 87 are successively rocked by the engagement of the cams on the cam-shaft 94 and the arms 95 on said levers, and the ends of the levers that are nearest to the pinions 79 are thrown downward, from the position shown in Figs. 4 and 17 to the position shown in Fig. 19. If the actuator-head 88 has previously been set, by the passage of one of the bull-teeth, by the dog 92, the corresponding pinion 80 will be turned one notch, and the primary adding wheel 71 and the connected indicating wheel will each be turned one step, and thereby the mechanism will "carry" or add one unit to the number shown on any wheel each time the preceding wheel completes the addition of the number of units it takes of the denomination represented by said wheel to make one unit of the next higher denomination.

I prefer to provide means for preventing an overrun of the primary adding wheel and stopping said wheel at exactly the right point in its revolution. For this purpose I arrange loosely upon the shaft 36 a lever 170 (see Figs. 17 and 19) in the plane of the segmented gear 28. This lever moves with the carriage and stands in the plane of the adding wheel that is being operated by the depression of a key. A lug 171 is formed on or secured to the shaft 36 and a spring 172 is arranged upon this shaft with one end in engagement with the lever 170 and the other end in engagement with the lug 171. Secured rigidly to the shaft 36 is an arm 170ª which when the shaft 36 is in normal position has its lower end engaging and forming a stop for the segmented gear 28 (see Fig. 19). When the shaft 36 is rocked, in the manner already described, the upper end of the lever 170 is thrown toward the adding wheel, and into engagement therewith, just as the wheel reaches the limit of its movement, thereby locking said wheel against further rotation. The spring connection between the lever 170 and the shaft 36 permits a further movement of said shaft after the end of the lever has come into engagement with, and has stopped the movement of, the adding wheel. This movement of the shaft 36 carries the lower end of the arm 170ª away from and releases the segmental gear 28, thus leaving said gear free to be turned. When the shaft 36 is rocked in the opposite direction, the lever 170 is returned to its normal position shown in Figs. 4 and 19.

*The resetting device.*—Means are provided for resetting all of the indicating wheels at zero whenever it is desired to begin a new record or indication. For this purpose I provide upon the shaft 70 a pair of loosely mounted arms 103 having pivoted between them a collector-plate 104 provided with a series of teeth 105. An arm 106 is also mounted loosely on the shaft 70 and is pivotally connected to the collector-plate 104 by a pivot 107 located outside of the pivot by which said collector-plate is connected to the arms 103. The arm 106 is provided with a lug 108 (see Figs. 20 and 21). An arm 109 is secured to the shaft 70, and extends therefrom alongside the loose arm 106. This arm 109 is provided at its outer end with a fork formed by the lugs 110, 110, and the lug 108 on the arm 106 stands between these lugs. A crank-arm 111 is secured to the shaft 70 outside of the casing. When it is desired to reset the indicating wheels at zero, to begin a new addition, the operator grasps the crank-arm 111 and turns the shaft 70. The arm 109 moves with the shaft 70 and when the rear lug 110 comes in contact with the lug 108 on the arm 106, the collector-plate is tilted on its pivots, on the arms 103, so as to move the teeth on said plate between the primary wheels, and a further movement of the shaft 70 and the arm 109 causes a movement therewith of the arm 106, the arms 103, and of the collector-plate 104, which is brought into engagement with the bull-teeth, thereby turning said primary wheels and the indicating wheels, and resetting all of the indicating wheels at zero. It is necessary, however, before the primary wheels can be turned by the resetting device, to move all of the double arm operating dogs 92 out of the path of movement of the bull-teeth. For this purpose I provide a forked head 112 mounted on pivots 113 in the plates 69. The inner arm of the dog 92 extends into the space between the prongs of the fork, and, by rocking said forked head on its pivot, the dogs may all be turned so as to be out of the path of movement of the bull-teeth. In order to rock the forked head 112 before the collector-plate engages the bull-teeth, I provide a short crank-arm 114 on one of the pivots 113, and this arm carries a small wheel 115 that is arranged in a slot 116 in a plate 117 mounted to turn on a stud or pin 118. This plate is formed with a gear sector 119 that is engaged by a pinion on the shaft 70. When the shaft 70 is turned for the purpose of operating the resetting device, the plate 117 is first turned, before the collector-plate is operated, and the slot in said plate, through the crank-arm 114 and wheel 115, rocks the forked head 112, and thereby moves all of the dogs 92 out of the path of the bull-teeth, thereby permitting said primary wheels to be turned freely by the resetting device so as to bring all of the indicating wheels to zero. When all of these wheels have been reset at zero, the movement of the crank-arm 111 is reversed, thereby moving the resetting device to its normal position, and releasing the dogs 92 and permitting them to move back into position to engage the bull-teeth on the primary adding wheels.

For the purpose of preventing the resetting device from being operating, except when the carriage is at the limit of its movement to the right and an adding operation has been completed, I provide the shaft 70 with a sleeve 120 having an arm 121, and I provide, upon the carriage 5, a stop-plate 122, which stands in the path of the arm 121, and prevents the shaft 70 from being turned except when the carriage is at its extreme position to the right, when the stop-plate will have passed beyond the path of the arm 121 and said shaft 70 will be free to turn on its axis (see Figs. 3, 5 and 6). I prefer to provide a bell-crank lever 121' that is mounted upon the shaft 23 and operated by the wing 121 on the shaft 70 to print a cipher upon the paper at the completion of the operation of resetting the indicating wheels at zero. This lever is shown in its two positions in Figs. 5 and 6. In Fig. 6 it is shown in normal position and in Fig. 5 it is shown in the position that it occupies at the completion of the printing operation. A spring 121" is connected to the lever 121' and brings it back to normal position at the end of the operation of resetting the indicating wheels.

*The item printing mechanism.*—I also provide means whereby as each key is operated the number represented by each key is printed on a suitable strip or sheet carried by the machine. Secured upon the front end of the carriage is a stationary frame 123, in which is mounted a vertically movable plunger 124, and on which is supported a swinging printing or type-head 125. The printing head is mounted by a pivot 126 on the frame 123, and is provided with a rack-segment 127 (see Fig. 4) that is engaged by a series of teeth 128 on the rack-bar 29. A suitable guide 129 is provided for the end of the rack-bar 29, and as this rack-bar is reciprocated, in the manner already described, as the keys are operated, the printing head is swung upon its pivot. An operating frame 130 is pivotally supported on the arms 131 that project from the front of the movable carriage. The bar 132 of this frame extends beneath the forwardly projecting ends 20 of the key-levers, so that said frame is rocked by the downward movement of any key. The shaft 133 of this frame has secured to it an arm 134 that engages a slot in the plunger 124, whereby said plunger is depressed each time a key is operated. The swinging printing head 125 is provided with a series of alining slots 135, having V-shaped upper ends, and the plunger 124 carries at its lower end, and at one side thereof, an aliner 136, adapted, as the plunger is depressed, to pass into one of the aliner slots and thereby to accurately position the printing head. The printing head is also provided with a series of vertically sliding type 137, adapted to print the numerals 0 to 11 (see Fig. 25). The shank of each type is arranged in a guide slot in the printing head, and a spring 138 is connected to a lug on each type and to a part of the printing head, and thereby tends to raise the type and hold it clear of the paper. The vertically movable plunger 124 is hollow and has arranged therein a sliding hammer rod 139, provided with a collar 140 and surrounded by a coiled spring 141. The rod 139 projects through the top of the plunger 124, and is provided with a washer 142, and a spring-controlled dog 143 is mounted on the frame 123, and its upper end normally stands under the edge of the washer 142. A lug 144 is arranged on the shaft 133, of the frame 130, in position to engage and release the dog 143 when the plunger has nearly completed it downward movement. As the plunger 124 descends, therefore, the hammer rod 139 is held by the dog 143, and the spring 141 is put under tension, and when said rod is released, by the tripping of the dog 143, the recoil of the spring causes the rod 139 to descend quickly and strike a sharp blow on the shank of the type that is then in printing position. This causes a clean impression to be made on the paper and enables the operator to make at the same time a number of carbon or manifold copies. A suitable spring 145 is provided in connection with the pivoted frame 130 which raises said frame and restores it to its normal position as each key is released. It will be understood that the printing head is swung a sufficient amount, as each key is operated, to bring the corresponding type into printing position, and that thereafter as the key approaches the lower end of its movement the aliner is operated to accurately position the type, and then the hammer rod is operated to make the impression.

*The punctuating device.*—I also provide mechanism for printing between the desired numbers suitable marks of punctuation, such as commas and periods, and for printing a series of dashes at the foot of the column, and above the total, each time that a total is printed. For this purpose I mount upon the transversely movable carriage a longitudinally sliding bar 146 (see Figs. 4 and 26) which carries at its forward end, alongside the swinging printing head, three vertically sliding type 147 (see Figs. 23 and 27) arranged in suitable guides carried by the sliding bar 146. Each of said type 147 has a lug 148 that comes below a shoulder 149 which is provided on each of the type 137 (see Fig. 27). Each of these type 147 is normally held in an elevated position by means of a spring 150, and the rear end of the sliding bar 146 is held against a stationary cam-bar 151 by means of a spring 152. In the machine shown in the drawings, which is arranged for adding and printing amounts of English money, a period (.) is printed before the figures representing pence, and a comma (,) before the number representing shillings, and another comma (,) between the figure representing hundreds of pounds and that representing thousands of pounds. The cam bar 151 is stationary (see Fig. 24) and the bar 146 is moved longitudinally as it slides across the face of said bar. By this means the type 147 are brought into printing position, at the proper time, and said type are operated by being engaged by the shoulder 149 on the type 137. Normally the type 147 stand in such position that they are not engaged by the shoulders on the type 137.

It will be noted (see Fig. 23) that the rear end of the sliding bar 146 has an inclined edge 153 above which is a shoulder 154. The rock-shaft 44 (heretofore described) is arranged in the rear of the edge of the bar 146 and is provided with a wing 155 (see Fig. 23). This shaft is rocked whenever it is desired to print a total, by means hereinafter described, and as it is rocked the wing 155 is moved against the inclined edge of the bar 146 and forces said bar forward, bringing into printing position, the type 147 carrying the dash (—) and the bar is locked in this position during the entire operation of printing a total. As soon as the total is printed the shaft 44 is automatically rocked back to its former position and the sliding bar 146 is released and is moved back to its normal position. By this means a straight line formed by a succession of dashes is printed at the foot of the column, and above the total each time that a total is printed.

*Printing totals.*—This machine does not automatically print the totals, but the operator, whenever he desires to print the total, or sum shown on the indicating wheels, must throw the adding mechanism out of operation, and, observing the amount shown on the indicating wheels, must print the number thus shown by operating the appropriate keys. To accomplish this it is only necessary to prevent the rack-bar 29 from being moved sidewise into mesh with the motor-wheel 6 and, as already explained, this is accomplished by rocking the shaft 44. I provide means to turn this shaft, and lock it, during the time that the total is being printed. For this purpose the shaft 44 has secured to it a crank-arm 156 (see Fig. 4) having a crank-pin 157 that engages a slot in a pivotal lever 158 (see Figs. 5 and 6). The lever 158 is pivoted on the wall of the casing 3, and its opposite end is pivotally connected to the shank-rod 159 of a total printing key 160. A spring 161 surrounds the shank 159, and tends to hold the parts in the position shown in Fig. 5. The lever 158 has a lug 162, and a pivoted locking plate 163 is arranged on the wall of the casing above said lever. When the key 160 is depressed the lever 158 is turned into the position shown in Fig. 6, the rock-shaft 44 is also turned, and the lug 162 is engaged by the locking plate 163, and the parts are locked in the position shown in Fig. 6 and remain locked in this position until the carriage reaches the limit of its movement toward the right. The carriage carries a releasing dog 165 (see Figs. 6 and 16), and, as the carriage approaches the limit of its movement, to the right, this dog 165 passes under a projection 166 on the locking plate 163, and said plate is raised and the lever 158 is released, the key is raised by the spring 161, and the lever 158 is returned to its normal position. A spring 167 is connected to the locking plate and tends to hold the lower end of said plate in engagement with the lug 162 on the lever 158.

It will be understood that it is necessary to operate the carrying device before disconnecting the adding mechanism when a total is to be printed. For this purpose the rock-shaft 98 is provided with a crank-arm 168 adapted to be engaged by a collar 169 on the shank-rod of the total key 160. By this means, when the total key is depressed, the shaft 98 is rocked and thereby the cam-shaft 94 is also rocked and the carrying mechanism is operated in the manner already described. The total key being depressed when the carriage is at the limit of its movement to the right, the operator has shown before him on the indicating wheels, the total of all the items that have been listed, and he therefore can determine how far toward the left it is necessary to move the carriage in order to print such total. When the total has been printed and the carriage approaches the limit of its movement toward the right, the locking plate 163 is released and the parts are automatically restored to normal position.

*Means for locking adding wheels.*—I also provide means for normally locking all of the primary adding wheels except the one that is, at the time, in mesh with the motor-wheel 6. For this purpose I provide a pivotal yoke 170′, that is held in engagement with the teeth of all the primary adding wheels by a spring 171′ (see Figs. 3, 4, 5, 6, 17 and 19). This yoke is pivotally supported upon and slides with the carriage, and is provided with a notch or recess that is always opposite the primary wheel that the motor wheel is in mesh with. A cam pin 172′ is provided on the casing of the machine in position to engage this yoke, when the carriage reaches the limit of its movement toward the right, and move said yoke out of engagement with all of the adding wheels. This leaves all of said wheels free to be turned and reset at zero, when, and only when, the carriage is in its extreme position toward the right.

*The paper feed.*—The paper to be printed upon is generally in the form of a rolled strip which is supported preferably upon a suitable support which may be arranged within the front part of the casing, as shown by dotted lines in Fig. 1. Feed rollers 173, 174, are mounted in the pivoted standards 175. The lower roller 173 is preferably provided with small wheels or buttons 176 by means of which said roller may be turned by hand. The upper roller has a ratchet wheel 177, and a ratchet-rod 178 rests on the wheel 177, so that each time the rod is pushed outward the upper roller is turned to feed the paper under the printing mechanism. The reverse movement of the rod does not turn the roller. The roller operating rod 178 is shown in full and dotted lines in Fig. 5. It has at its rear end a fork slidably mounted upon a pin. Pivotally connected to an arm on the rod 178 is a rod 179 having its rear end adjustably connected to a slotted pivotally supported lever 180. The spring 167 is preferably connected to a pin 181 in the upper end of the lever 180, and projecting through a slot in the wall of the casing (see Fig. 5). A stud 182 is also secured on the lever 180 and projects into the casing through a slot in its wall (see Fig. 16). A cam plate 183 is pivoted on this stud. This plate has the inclined cam surface 184. A pin 185 projects from the top of the wall 9 of the carriage. When the carriage reaches nearly to the limit of its movement toward the right, the pin 185 passes under the cam-plate 183 into the position shown in Fig. 16. As the carriage begins to move toward the left, the pin 185 rides along the cam surface 184 and forces the lower end of the lever 180 toward the feed rollers, thereby, through the ratchet-rod 178, turning the feed-rollers and moving forward the paper. The amount of feed can be adjusted by moving the end of the rod 179 toward or from the pivot of the lever 180. The movement of the lever 180 and the ratchet rod is reversed by the spring 167.

As shown in Fig. 9 the feed-rollers, are, as already stated, mounted in the pivoted standards 175. These standards are preferably locked in an upright position by the hook 186 engaging a pin 187. As it is sometimes desirable to move the paper forward, or toward the operator, far enough to permit the last amount printed to be read, I prefer to provide means for tilting or rocking the standards upon their pivots. For this purpose I provide the bell-crank lever 188 mounted upon the same pivot as one of the standards. The forward end of this lever projects through the casing in position to be moved by the operator. The inner arm of the bell-crank projects upward and is provided with a lug 189 adapted to engage and release the hook 186, and its upper end is adapted to engage and lift the end of the ratchet rod 178. A lug 190 below the pivot engages the lower end of the standard (see Fig. 9). A spring 191 is connected to this lever and tends to hold it in the position shown in Fig. 9, and with the standards in an upright position. By pressing down on the outer arm of the bell-crank lever the standards are rocked toward the operator and the feed-rollers are moved toward the operator, thereby drawing the paper from under the printing head and exposing the last amount printed thereon. When the bell-crank is released the parts are returned to their normal position by the action of the spring 191.

The paper preferably passes over a platen 192 (see Fig. 9) and below an inked ribbon. This ribbon is carried by the spools 193 and passes across the machine above the paper and the platen 192. A pivoted dog 194 is provided on the carriage, and this dog is adapted to engage and turn the spool at the right hand side of this casing. When all of the ribbon has been wound off from one spool and on to the other, the spools may be reversed. I also prefer to provide means operated by the first key that is depressed in the listing of any item to form a barrier against any further movement of the carriage toward the left until said carriage has moved to its extreme position at the right. The device that I prefer to use for this purpose is shown clearly in Figs. 6, 10 and 14. As here shown, the pointer 59 carries a spring dog 195 having one end beveled and its opposite end depressed so as to bear upon the upper surface of a shaft 196 that is rotatably mounted in bearings 197 on the top of the casing of the machine. This shaft has a series of fine ratchet teeth 197 and, adjacent thereto, a flat surface 198. It also is provided with an inclined lug 199 and with a depending loop 200. The rock shaft 36 is also provided with an arm 201 that is in position to engage loop 200 in any position of the carriage. The parts normally stand in the position shown in Fig. 14 of the drawings and the carriage may be freely moved toward the left, the end of the dog 195 traveling on the smooth surface 198 of the shaft 196. When the operator depresses any key, however, the shaft 36 is rocked; as hereinafter described, and the arm 201 engaging the loop 200, rocks the shaft 196 bringing the ratchet teeth 197 under the end of the dog 195 and locking the carriage against movement toward the left. The carriage may, however, be moved freely toward the right and when the beveled end of the dog 195 strikes the lug 199, the shaft 196 will be rocked back to normal position and the ratchet teeth 197 will be turned into the position shown in Fig. 14 and out of the path of the dog 195.

The details of the construction of the machine may be varied in many particulars without departing from my invention.

I claim as my invention:

1. The combination, in a machine of the class described, with a series of indicating wheels, and a series of primary adding wheels in engagement therewith, of a laterally movable carriage, a motor-wheel mounted upon said carriage and adapted to be brought into mesh successively with said primary adding wheels as said carriage is moved, a series of numbered keys mounted upon said carriage, connections between said keys and said motor-wheel whereby said motor-wheel is turned by each key an amount corresponding to the numerical value of the operated key, means for advancing said carriage from left to right, step by step, as said keys are operated, and a carrying mechanism that is put into operative position as said keys are operated during the left to right movement of the carriage, substantially as described.

2. The combination, in a machine of the class described, with a series of indicating wheels and a series of primary adding wheels in engagement therewith, of a laterally movable carriage, a motor-wheel mounted upon said carriage, and adapted to be brought into mesh successively with said primary adding wheels as said carriage is moved, a series of numbered keys, mounted upon said carriage, connections between said keys and said motor-wheel whereby said motor-wheel is turned by each key an amount corresponding to the numerical value of the operated key, and a printing mechanism controlled by said motor-wheel and arranged to print upon a suitable strip or sheet numbers corresponding to the operated keys, substantially as described.

3. The combination, in a machine of the class described, with a series of indicating wheels, and a series of primary adding wheels in engagement therewith, of a laterally movable carriage, a motor-wheel mounted upon said carriage and adapted to be brought into mesh successively with said primary adding wheels as said carriage is moved, a series of keys mounted upon said carriage, connections between said keys and said motor-wheel, means for advancing said carriage from left to right, step by step, as said keys are operated, a carrying mechanism that is put in operative position during the left-to-right movement of the carriage, and means for operating said carrying mechanism during the reverse movement of the carriage, substantially as described.

4. The combination, in a machine of the class described, with a series of indicating wheels and a series of primary adding wheels in engagement therewith, of a laterally movable carriage, a motor-wheel mounted upon said carriage and adapted to be brought successively into engagement with said adding wheels as said carriage is moved, a series of keys also mounted upon said carriage, operative connections between said keys and said motor-wheel, a carrying mechanism connected with said adding wheels and arranged to be set in carrying position during the left-to-right movement of said carriage, and a key-controlled means for operating said carrying mechanism when the carriage is at the limit of its travel, substantially as described.

5. The combination, in a machine of the class described, with a series of indicating wheels, and a series of primary adding wheels in engagement therewith, of a laterally movable carriage, a motor-wheel mounted upon said carriage, and adapted to be brought successively into engagement with said adding wheels as said carriage is moved, a series of keys also mounted upon said carriage, operative connections between said keys and said motor-wheel, a spring arranged to move said carriage from left to right, and to be put under tension as said carriage is moved, manually, in the reverse direction, an escapement controlling the left-to-right movement of said carriage, and operated by said keys and means operated by the movement of said carriage for restoring each key to its normal position.

6. The combination, in a machine of the class described, with a series of indicating wheels, and a series of primary adding wheels in engagement therewith, of a laterally movable carriage, a motor-wheel mounted upon said carriage and adapted to be brought successively into engagement with said adding wheels as said carriage is moved, a series of keys mounted upon said carriage, operative connections between said keys and said motor-wheel, a printing mechanism, and means controlled by said motor-wheel for operating said printing mechanism, substantially as described.

7. The combination, in a machine of the class described, with a series of indicating wheels, and a series of primary adding wheels in engagement therewith, of a transversely movable carriage, a motor-wheel loosely mounted on a shaft upon said carriage and adapted to be brought into engagement with said adding wheels, a series of hubs mounted fixedly upon the shaft supporting said motor-wheel and arranged in successive steps, a segmented gear also mounted fixedly upon said shaft and located contiguous to said motor-wheel, a series of key-levers arranged to engage said hubs, keys for operating said levers, and a rack-bar normally in engagement with said segmental gear, and adapted to be shifted, upon the operation of a key, into engagement with said motor-wheel, substantially as described.

8. The combination, in a machine of the class described, with a series of indicating wheels, and a series of primary adding wheels in engagement therewith, of a transversely movable carriage, a motor-wheel and operating keys mounted thereon, a printing mechanism also mounted on said carriage and an operative connection between said motor-wheel and said printing mechanism, substantially as described.

9. The combination, in a machine of the class described, with the indicating wheels, and the primary adding wheels in engagement therewith, of a transversely movable carriage, a motor-wheel mounted upon said carriage and adapted to be brought into engagement successively with said adding wheels, a printing mechanism mounted upon said carriage and controlled by said motor-wheel, a series of keys also mounted upon said carriage, and operative connections between said keys and said motor-wheel, substantially as described.

10. The combination, in a machine of the class described, with the indicating and adding wheels, of a transversely movable carriage, a motor-wheel and a series of operating keys mounted on said carriage, levers connected with said keys for moving said motor-wheel, means for moving said carriage, step-by-step, from left to right as said keys are operated, and a printing mechanism carried by said carriage and controlled by said keys and motor-wheel, substantially as described.

11. The combination, in a machine of the class described, with the indicating and adding wheels, of a transversely movable carriage, a motor-wheel and a series of operating keys mounted on said carriage levers connected with said keys for moving said motor-wheel distances proportioned to the numerical values of said keys, and a printing mechanism also mounted upon said carriage and controlled by said keys and motor-wheel, substantially as described.

12. The combination, in a machine of the class described, with a series of indicating wheels and a series of adding wheels connected therewith, of a transversely movable carriage, a motor-wheel mounted upon said carriage and adapted to be brought into engagement with said adding wheels successively as said carriage is moved, means for locking all of the adding wheels except the one that is engaged by said motor-wheel, means for releasing all of said wheels when the carriage reaches the limit of its left-to-right movement and means for operating said motor-wheel, substantially as described.

13. The combination, in a machine of the class described, with a series of adding wheels, representing numbers of varying denominational values, a carrying device between each wheel and the next succeeding adjacent wheel, and means for setting each carrying device in operative position as often as the preceding wheel completes that portion of a revolution corresponding to its denominational value, of a transversely movable carriage, a motor-wheel mounted upon said carriage and adapted to engage said adding wheels successively as the carriage is moved from left to right, means for operating said motor-wheel, and means actuated upon the reverse movement of the carriage for operating the carrying devices that have been put into operative position, substantially as described.

14. The combination, in a machine of the class described, with a series of adding wheels, of the transversely movable carriage, a motor-wheel and a series of operating keys therefor mounted upon said carriage, means for advancing said carriage and thereby bringing said motor-wheel successively into engagement with said adding wheels, a printing mechanism also mounted upon said carriage and controlled by said motor-wheel and means actuated by said keys for operating said printing mechanism, substantially as described.

In witness whereof, I have hereunto set my hand this 31st day of March, 1908.

EDWIN L. MATTHEWS.

Witnesses:
C. G. HANSON,
J. A. BYINGTON.

Copies of this patent may be obtained for five cents each, by addressing the "Commissioner of Patents, Washington, D. C."